Patented Oct. 31, 1950

2,528,267

UNITED STATES PATENT OFFICE 2,528,267

RESOLUTION OF AMINES WITH PYRROLIDONE CARBOXYLIC ACID

Robert J. Dearborn and Jakob A. Stekol, Toledo, Ohio, assignors to International Minerals and Chemical Corporation, a corporation of New York No Drawing. Application April 30, 1947, Serial No. 745,098

17 Claims. (Cl. 260—570.8)

This invention relates to a process for resolving mixtures of racemic amines and compositions containing such amines with the aid of a novel resolving agent. More particularly this invention relates to a process for the resolution of racemic amines with the aid of an optically active form of pyrrolidone carboxylic acid.

Racemic amines have been resolved by employing optically active forms of various acids, such as camphoric acid, malic acid, mandelic acid, tartaric acid, and quinic acid. When such acids are employed for the resolution of racemic amines various difficulties are encountered, among which can be mentioned the frequent poor recovery of the separated optically active isomers of the amine, the relatively high cost of the acid reagents, and the toxicity of a great many of such compounds. On the other hand, it has now been found that the resolution of racemic amines with an optically active form of pyrrolidone carboxylic acid has several important and novel advantages over the previously employed acid reagents. The optically active forms of pyrrolidone carboxylic acid can be prepared in good yields from inexpensive chemicals, and these compounds are relatively non-toxic. Furthermore, when employed as a resolving agent in the resolution of racemic amines, the resolved amines are recovered in a high state of purity and in excellent yields due to the inherent solubility characteristics of the amine-acid compounds.

One object of the invention is to provide an improved process for the resolution of racemic amines and compositions containing mixtures of such amines.

Another object of the invention is to provide an improved process for the resolution of racemic amines which results in an excellent recovery of the separated optically active isomers of the amines in a high state of purity.

It is another object of the invention to provide an improved process for the resolution of racemic amines by employing a new and useful resolving agent which can be easily prepared from inexpensive materials, and which is relatively non-toxic.

According to the process which is the subject of this invention, compositions which contain racemic amines or mixtures thereof can be treated with an optically active isomer of pyrrolidone carboxylic acid, and the resulting products can be separated and treated with a basic reagent to produce an optically active form of the amine reactant. This process can be conducted with or without a solvent for the reactants and at a temperature which is below the decomposition point of the reactants, the time of reaction being dependent upon the rate at which the optically active form of pyrrolidone carboxylic acid combines with the amine reactants.

According to the process which is the subject of the invention a racemic amine or a composition containing at least one racemic amine is treated with l-pyrrolidone carboxylic acid, preferably in a solvent for the reactants. Among the solvents which are applicable to this process can be included aliphatic alcohols such as methyl alcohol, isopropyl alcohol, n-butyl alcohol, etc., low-molecular weight esters and ketones such as ethyl acetate and acetone, and hydrocarbon solvents such as naphtha, benzene, and toluene. Water may also be used as a solvent. It is obvious that mixtures of these solvents which are miscible may also be advantageously employed. The temperatures at which the process is conducted are essentially below the decomposition point of the reactants and usually within a range of between about 20° C. and about 150° C. Preferably the temperature at which the process is carried out is controlled by the boil-points of the solvents. Various types of racemic amines may and have been resolved by treating such amines with an optically active form of pyrrolidone carboxylic acid. Among these can be mentioned alkyl amines such as racemic 2-amino-n-heptane and racemic 2-amino-n-octane, aralkyl amines such as dl-alpha-phenylethylamine, and alkaloids such as dl-ephedrine, dl-brucine, dl-menthylamine, and dl-quinine. Preferably, approximately equimolar quantities of the amines and an optically active form of pyrrolidone carboxylic acid are reacted in a solvent for the reactants such as n-butyl alcohol and the resulting product is removed from solution by cooling said solution slowly to about 0° C. The crystallized product is recovered, recrystallized from a solvent such as alcohol or water, and the recrystallized product is then treated with a base which is more basic than the amine reactant. This neutralization step is preferably conducted with an inorganic base such as sodium hydroxide. The resulting optically active amine is recovered in excellent yields and may be isolated by removing it from the alkaline aqueous phase by decanting. To obtain the other optically active isomer of the amine from the amine-acid product which remains in the original solution, the solvent is evaporated, the residue taken up in water, and the solution is made alkaline with sodium hydroxide. The resulting amine layer is separated and purified by further resolution with an isomer of pyrrolidone carboxylic acid having a rotation opposite to that of the amine.

It is not essential to employ only equivalent amounts of the resolving agent with respect to the racemic amines. An excess of either reactant may be present, the amine-acid products being purified and treated as described herein.

In order to afford a more complete description of the process which is the subject of the in-

Example 1

Resolution of dl-alpha-phenylethylamine.

l-Pyrrolidone carboxylic acid is prepared by suspending pure l(+)-glutamic acid in an equal weight of water and heating this mixture in an autoclave for 3 to 5 hours at 135° to 140° C. The warm solution is decolorized with activated carbon (if necessary), cooled, and the precipitate of l-pyrrolidone carboxylic acid is removed by filtration. The product is recrystallized from butyl alcohol or acetone. Melting point 159.5 to 160° C. (uncorrected) specific rotation $(a)_D$ at 25° C.$=-11.3°$. The mother liquors from the crystallization can be worked up to obtain additional amounts of the acid.

About 129.0 g. (1.0 mol) of l-pyrrolidone carboxylic acid is dissolved in 1,000 ml. of n-butyl alcohol which is maintained at a temperature of about 89° to about 90° C. To this solution is added about 121 g. (1.0 mol) of dl-alpha-phenylethylamine. The solution is allowed to cool slowly to about 2° C. for a period of about 24 hours. Crystallization of the product may be accelerated by seeding the solution with a few crystals of d-alpha-phenylethylamine-l-pyrrolidone carboxylate. The resulting precipitate is removed by filtration (dry weight=about 125 g.), is redissolved in 1,000 ml. of n-butyl alcohol at about 90° C., and the solution is cooled slowly to 2° C. The precipitate of pure d-alpha-phenylethylamine-l-pyrrolidone carboxylate is collected on a filter, washed with 100 ml. of cold butyl alcohol, and dried. The product weighs about 85 to 90 g. (68–72%). Specific rotation, $(a)_D$ at 25° C.$=-12.4°$ in water. By concentrating the filtrates from both crystallizations an additional 15 g. of the pure salt may be obtained, making a total of about 100 to 105 g. (80–84% yield).

To about 100 g. (0.4 mol.) of the amine salt dissolved in 100 ml. of water is added a solution of about 18.0 g. (0.45 mol.) of sodium hydroxide, dissolved in 50 ml. of water. The amine separates from the aqueous phase as an oil and is recovered by extracting the oil-water mixture with three 10 ml. portions of benzene. The benzene extracts are dried over solid sodium hydroxide and distilled. The yield of distilled amine (boiling point, 177.5–178° C.) is 46–48 g. or 95%. Specific rotation $(a)_D$ at 25° C.$=+39.5°$ to 40°.

The aqueous solution remaining after separation of the amine by benzene extraction is adjusted to a pH of about 2.0 with concentrated hydrochloric acid and the resulting solution is evaporated in vacuo nearly to dryness. The residue is triturated with 150 ml. of alcohol on a steam bath and filtered to remove sodium chloride. The filtrate is concentrated to incipient crystallization and diluted with 2 volumes of ether. The l-pyrrolidone carboxylic acid which precipitates is removed by filtration. The dried acid weighs 44.0 g., which represents a recovery of 90%.

The butyl alcohol filtrate from the first crystallization is evaporated to a thick syrup and diluted with 200 ml. of water. The amine salt is decomposed with about 26 g. (0.65 mol) of sodium hydroxide, dissolved in 75 ml. of water. The amine and pyrrolidone carboxylic acid are recovered as outlined above. The amine, weighing about 65–67 g., has a specific rotation at 25° C. of $-25°$ to $-27°$, indicating 65–70% of the l-isomer. This may be purified by a resolution with d-pyrrolidone carboxylic acid by employing the procedure described above.

Example 2

About 129 g. (1.0 mol) of l-pyrrolidone carboxylic acid is dissolved in 1200 ml. of acetone maintained at a temperature of about 55° C. To this solution is added about 115 g. (1.0 mol) of dl-2-amino-n-heptane. The solution is allowed to cool slowly to about 2° C. over a 24 hr. period. The resulting precipitate is isolated by filtration, and the amine salt is redissolved in 1,000 ml. of acetone at 55° C. The solution is cooled slowly to about 2° C. and the precipitate of pure d-2-amino-n-heptane-l-pyrrolidone carboxylate is collected on a filter, washed with 100 ml. of cold acetone, and dried. The yield of amine salt is about 67 g. (55%). Specific rotation $(a)_D$ at 25° C.$=-17.3°$ (5% in water). By concentrating the filtrates from both crystallizations an additional 10 g. of the pure salt may be obtained.

The optically active d-2-amino-n-heptane is recovered as described in Example 1.

Example 3

About 129 gms. (1.0 mol) of racemic 2-amino-n-octane is dissolved in 1,000 ml. of n-butyl alcohol maintained at a temperature of about 89° to 90° C. To this solution is added about 129 g. (1.0 mol) of l-pyrrolidone carboxylic acid. The solution is cooled slowly to about 0° C. over a 24 hr. period. Crystallization of the d-2-amino-n-octane-l-pyrrolidone carboxylate may be accelerated by seeding the solution with a few crystals of this salt. The precipitate is removed by filtration and is redissolved in 1,000 ml. of butyl alcohol at about 90° C. This solution is cooled slowly to about 2° C. and the precipitation of 2-d-amino-n-octane-l-pyrrolidone carboxylate is collected on a filter, washed with 100 ml. of cold butyl alcohol, and dried. The yield of dried salt is about 103.0 g. or 80%. Specific rotation $(a)_D$ at 25° C.$=-16.4°$ (5% in water).

This salt is treated as described in Example 1 to recover d-2-amino-n-octane in about 80% yields. Specific rotation, $(a)_D$ at 25° C.$=+6.3°$.

The butyl alcohol solution which remains after removal of the d-amine salt is evaporated to a thick syrup and diluted with 200 ml. of water. The amine salt is decomposed with 26 g. of sodium hydroxide dissolved in 75 ml. of water, and the amine and pyrrolidone carboxylic acid are separately recovered as described in Example 1. A recovery of 70 to 75% of the l-2-amino-n-octane is realized. This may be further purified by resolution with d-pyrrolidone carboxylic acid.

The foregoing examples are given by way of illustration and not by way of limitation. The invention may be carried out employing obvious extensions without departing from its spirit and scope.

What is desired to be claimed and protected by Letters Patent is:

1. The process of resolving compositions containing at least one racemic amine which comprises reacting said compositions with an optically active isomer of pyrrolidone carboxylic acid, separating the resultant reaction product thereof, and treating the same with a base which is more basic than the amine reactant.

2. The process of resolving a racemic amine which comprises reacting said amine which is more basic than pyrrolidone carboxylic acid with an optically active isomer of pyrrolidone carboxylic acid, separating the resultant reaction product thereof, and treating the same with a base which is more basic than the amine reactant.

3. The process of resolving compositions containing at least one racemic amine which comprises reacting said compositions with l-pyrrolidone carboxylic acid, separating the resultant reaction product thereof, and treating the same with a base which is more basic than the amine reactant.

4. The process of resolving a racemic amine which comprises reacting said racemic amine with l-pyrrolidone carboxylic acid, separating the resultant reaction product thereof, and treating the same with a base which is more basic than the amine reactant.

5. The process of resolving compositions containing at least one racemic amine which comprises reacting said compositions with an optically active isomer of pyrrolidone carboxylic acid in a solvent for the reactants at a temperature essentially below the decomposition point of the reactants, separating the resultant reaction product, and treating the same with a base which is more basic than the amine reactant.

6. The process of resolving compositions containing at least one racemic amine which comprises reacting said compositions with l-pyrrolidone carboxylic acid in a solvent for the reactants at a temperature essentially below the decomposition point of the reactants, separating the resultant reaction product, and treating the same with a base which is more basic than the amine reactants.

7. The process of resolving a racemic amine which comprises reacting said racemic amine with an optically active isomer of pyrrolidone carboxylic acid in a solvent for the reactants at a temperature essentially below the decomposition point of the reactants, separating the resultant reaction product, and treating the same with a base which is more basic than the amine reactants.

8. The process of resolving a racemic amine which comprises reacting said racemic amine with l-pyrrolidone carboxylic acid in a solvent for the reactants at a temperature essentially below the decomposition point of the reactants, separating the resultant reaction product, and treating the same with a base which is more basic than the amine reactant.

9. The process of resolving compositions containing at least one racemic amine which comprises reacting said compositions with an optically active isomer of pyrrolidone carboxylic acid in a solvent for the reactants at a temperature essentially below the decomposition point of the reactants, separating the resultant reaction product from the solution by crystallization, and treating said product with an inorganic base.

10. The process of resolving compositions containing at least one racemic amine which comprises reacting said compositions with l-pyrrolidone carboxylic acid in a solvent for the reactants at a temperature essentially below the decomposition point of the reactants, separating the resultant reaction product from the solution by crystallization, and treating said product with an inorganic base.

11. The process of resolving a racemic amine which comprises reacting said racemic amine with an optically active isomer of pyrrolidone carboxylic acid in a solvent for the reactants at a temperature essentially below the decomposition point of the reactants, separating the resultant reaction product from the solution by crystallization, and treating said product with an inorganic base.

12. The process of resolving a racemic amine which comprises reacting said racemic amine with l-pyrrolidone carboxylic acid in a solvent for the reactants at a temperature essentially below the decomposition point of the reactants, separating the resultant reaction product from the solution by crystallization, and treating said product with an inorganic base.

13. The process of resolving a racemic primary aliphatic amine which comprises reacting said amine with l-pyrrolidone carboxylic acid in an organic solvent for the reactants at a temperature between about 25° C. and about 125° C., separating the resultant reaction product from the solution by crystallization, and treating said product with an inorganic base.

14. The process of resolving a racemic primary aralkyl amine which comprises reacting said amine with l-pyrrolidone carboxylic acid in an organic solvent for the reactants at a temperature between about 25° C. and about 125° C., separating the resultant reaction product from solution by crystallization, and treating said product with an inorganic base.

15. The process of resolving dl-alpha-phenylethylamine which comprises reacting said amine with l-pyrrolidone carboxylic acid in an organic solvent for the reactants at a temperature between about 25° C. and about 125° C., separating d-alpha-phenylethylamine-l-pyrrolidone carboxylate by cooling the solution between about 0° C. and about 10° C., and treating said product with sodium hydroxide.

16. The process of resolving dl-2-amino-n-heptane which comprises reacting said amine with l-pyrrolidone carboxylic acid in an organic solvent for the reactants at a temperature between about 25° C. and about 125° C., separating the resultant reaction product from solution by crystallization by cooling the solution between about 0° C. and about 10° C., and treating said product with sodium hydroxide.

17. The process of resolving dl-2-amino-n-octane which comprises reacting said amine with l-pyrrolidone carboxylic acid in an organic solvent for the reactants at a temperature between about 25° C. and about 125° C., separating the resultant reaction product from solution by crystallization by cooling the solution between about 0° C. and about 10° C., and treating the resultant product with sodium hydroxide.

ROBERT J. DEARBORN.
JAKOB A. STEKOL.

REFERENCES CITED

The following references are of record in the file of this patent:

UNITED STATES PATENTS

| Number | Name | Date |
|---|---|---|
| 2,112,329 | Braun | Mar. 29, 1938 |
| 2,276,508 | Nabenhauer | May 17, 1942 |

OTHER REFERENCES

Ingersoll, "J. Am. Chem. Soc.," vol. 47, pages 1168–1173 (1925).

Karrer, "Organic Chemistry" (Nordman Publishing Co., N. Y. 1938), pages 92–93.

Brode et al., "J. Am. Chem. Soc.," vol. 64, pages 1449–1450 (1942).

Mann et al., "J. Chem. Soc." (London), 1944, pages 546–461.

Certificate of Correction

Patent No. 2,528,267                                            October 31, 1950

ROBERT J. DEARBORN ET AL.

It is hereby certified that error appears in the printed specification of the above numbered patent requiring correction as follows:

Column 2, line 29, after "dl-quinine." insert *All of the heretofore mentioned racemic amines which are resolved by practicing the present novel process are more basic in character than is the resolving agent, pyrrolidone carboxylic acid. This is a property which is inherent in the amines heretofore specified.*; column 4, lines 39 and 40, for "2-d" read *d-2*; column 4, line 66, column 5, lines 5, 11, 18, 27, 35, 44, 53, 62, 70, and column 6, lines 4, 13, 21, respectively, after "amine" insert *which is more basic than pyrrolidone carboxylic acid,*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*